United States Patent
Desai et al.

(10) Patent No.: US 9,971,761 B2
(45) Date of Patent: *May 15, 2018

(54) PARALLELIZING SEMANTICALLY SPLIT DOCUMENTS FOR PROCESSING

(71) Applicant: International Business Machines Corporation, Armonk, NY (US)

(72) Inventors: Rajesh M. Desai, San Jose, CA (US); Philip E. Parker, York, SC (US); Roger C. Raphael, San Jose, CA (US); Paul S. Taylor, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/734,404

(22) Filed: Jun. 9, 2015

(65) Prior Publication Data

US 2016/0179775 A1 Jun. 23, 2016

Related U.S. Application Data

(63) Continuation of application No. 14/578,545, filed on Dec. 22, 2014.

(51) Int. Cl.
*G06F 17/27* (2006.01)

(52) U.S. Cl.
CPC ........ *G06F 17/277* (2013.01); *G06F 17/2785* (2013.01)

(58) Field of Classification Search
CPC ............. G06F 11/3447; G06F 17/2229; G06F 17/2288; G06F 17/248; G06F 17/27; G06F 17/2745; G06F 17/30011; G06F 17/218; G06F 17/241; G06F 17/277; G06F 17/2775; G06F 17/2785; G06F 17/3001; G06F 17/30038; G06F 17/30616; G06F 17/30705
See application file for complete search history.

(56) References Cited

U.S. PATENT DOCUMENTS

| | | | |
|---|---|---|---|
| 3,662,401 A * | 5/1972 | Collins | ................ G06F 9/4436 718/103 |
| 6,070,133 A | 5/2000 | Brewster et al. | |
| 6,112,201 A | 8/2000 | Wical | |

(Continued)

FOREIGN PATENT DOCUMENTS

WO    2007113585    10/2007

OTHER PUBLICATIONS

U.S. Appl. No. 14/578,545; filed Dec. 22, 2014; Entitled "Parallelizing Semantically Split documents for Processing."

(Continued)

*Primary Examiner* — Wilson Tsui
(74) *Attorney, Agent, or Firm* — Edward J. Wixted, III

(57) ABSTRACT

In an approach for parallelizing document processing in an information handling system, a processor receives a document, wherein the document includes text content. A processor extracts information from the text content, utilizing natural language processing and semantic analysis, to form tokenized semantic partitions, comprising a plurality of sub-documents. A processor schedules a plurality of concurrently executing threads to process the plurality of sub-documents.

7 Claims, 3 Drawing Sheets

(56) References Cited

U.S. PATENT DOCUMENTS

| | | | |
|---|---|---|---|
| 6,185,592 B1 | 2/2001 | Boguraev et al. | |
| 6,473,730 B1 | 10/2002 | McKeown et al. | |
| 6,857,102 B1 | 2/2005 | Bickmore et al. | |
| 7,047,486 B1 | 5/2006 | Nagao | |
| 7,840,564 B2* | 11/2010 | Holzgrafe | G06F 17/30011 707/602 |
| 7,966,305 B2 | 6/2011 | Olsen | |
| 2001/0025288 A1 | 9/2001 | Yanase et al. | |
| 2002/0052730 A1 | 5/2002 | Nakao | |
| 2004/0205461 A1 | 10/2004 | Kaufman et al. | |
| 2005/0120298 A1* | 6/2005 | Petrujkic | G06F 17/2229 705/7.13 |
| 2008/0109399 A1* | 5/2008 | Liao | G06F 17/30719 |
| 2009/0070101 A1 | 3/2009 | Masuyama et al. | |
| 2011/0302162 A1* | 12/2011 | Xiao | G06F 17/30867 707/724 |
| 2011/0314024 A1* | 12/2011 | Chang | G06F 17/30646 707/740 |
| 2012/0079372 A1 | 3/2012 | Kandekar et al. | |
| 2012/0330958 A1* | 12/2012 | Xu | G06F 17/16 707/738 |
| 2013/0124193 A1* | 5/2013 | Holmberg | G06F 17/27 704/9 |
| 2014/0181647 A1 | 6/2014 | Quintana | |
| 2015/0106697 A1* | 4/2015 | Zhang | G06F 17/212 715/243 |

OTHER PUBLICATIONS

Appendix P: List of IBM Patents or Patent Applications Treated As Related.

\* cited by examiner

PARALLELIZING SEMANTICALLY SPLIT DOCUMENTS FOR PROCESSING

BACKGROUND OF THE INVENTION

The present invention relates generally to the field of information retrieval, and more particularly to semantically decomposing a single document into multiple documents for parallel processing.

Information retrieval is the activity of obtaining information resources relevant to an information need from a collection of information resources. Searches can be based on metadata or on full-text (or other content-based) indexing. Automated information retrieval systems are used to reduce what has been called "information overload." Information retrieval systems may be used to provide access to books, journals, and other documents. Web search engines are the most visible information retrieval applications.

Natural language processing is a field of computer science, artificial intelligence, and linguistics concerned with the interactions between computers and human (natural) languages. As such, natural language processing is related to the area of human-computer interaction. Many challenges in natural language processing involve natural language understanding, that is, enabling computers to derive meaning from human or natural language input, and others involve natural language generation.

An automated information system is an assembly of computer hardware, software, firmware, or any combination of these, configured to accomplish specific information-handling operations, such as: communication, computation, dissemination, processing, and storage of information. Included are computers, word processing systems, networks, or other electronic information handling systems, and associated equipment. Managing information systems are a common example of automated information systems.

SUMMARY

Aspects for an embodiment of the present invention disclose a method, computer program product, and computing system for parallelizing document processing in an information handling system. A processor receives a document, wherein the document includes text content. A processor extracts information from the text content, utilizing natural language processing and semantic analysis, to form tokenized semantic partitions, comprising a plurality of sub-documents. A processor schedules a plurality of concurrently executing threads to process the plurality of sub-documents.

DETAILED DESCRIPTION

In the current state of information retrieval from unstructured sources, most systems resort to processing a document as an atomic (i.e., single or complete) unit of information. Information retrieval systems essentially treat the document as a single unit of processing in the entire workflow, associated with the act of extraction, spread over multiple steps in the workflow. Embodiments of the present invention recognize that using single, non-decomposable units (e.g., a document) for all processing functions related to the extraction process results in limited parallelism. Embodiments of the present invention further recognize that such an approach reduces the overall throughput of the system, as the parallelism achieved is coarse grained—by and large. The software stacks that comprise the extraction are, essentially, single threaded, which, in turn, limits the total amount of potentially outstanding parallelizable, primitive operations that could be achieved by more specialized hardware co-processing.

Embodiments of the present invention recognize that a solution to the problem of limited parallelism by processing a document as an atomic unit of information is to semantically decompose the document; together, with a methodology of storage of the extracted state and knowledge of the extraction process, the document unit can be decomposed into a notion of sub-document units that can be processed in parallel based on data dependency knowledge declared to the system. Semantically decomposing the document would increase the overall throughput of the system and enable more efficient hardware primitive operations to be exploited.

Embodiments of the present invention will now be described in detail with reference to the Figures.

Figure 1:
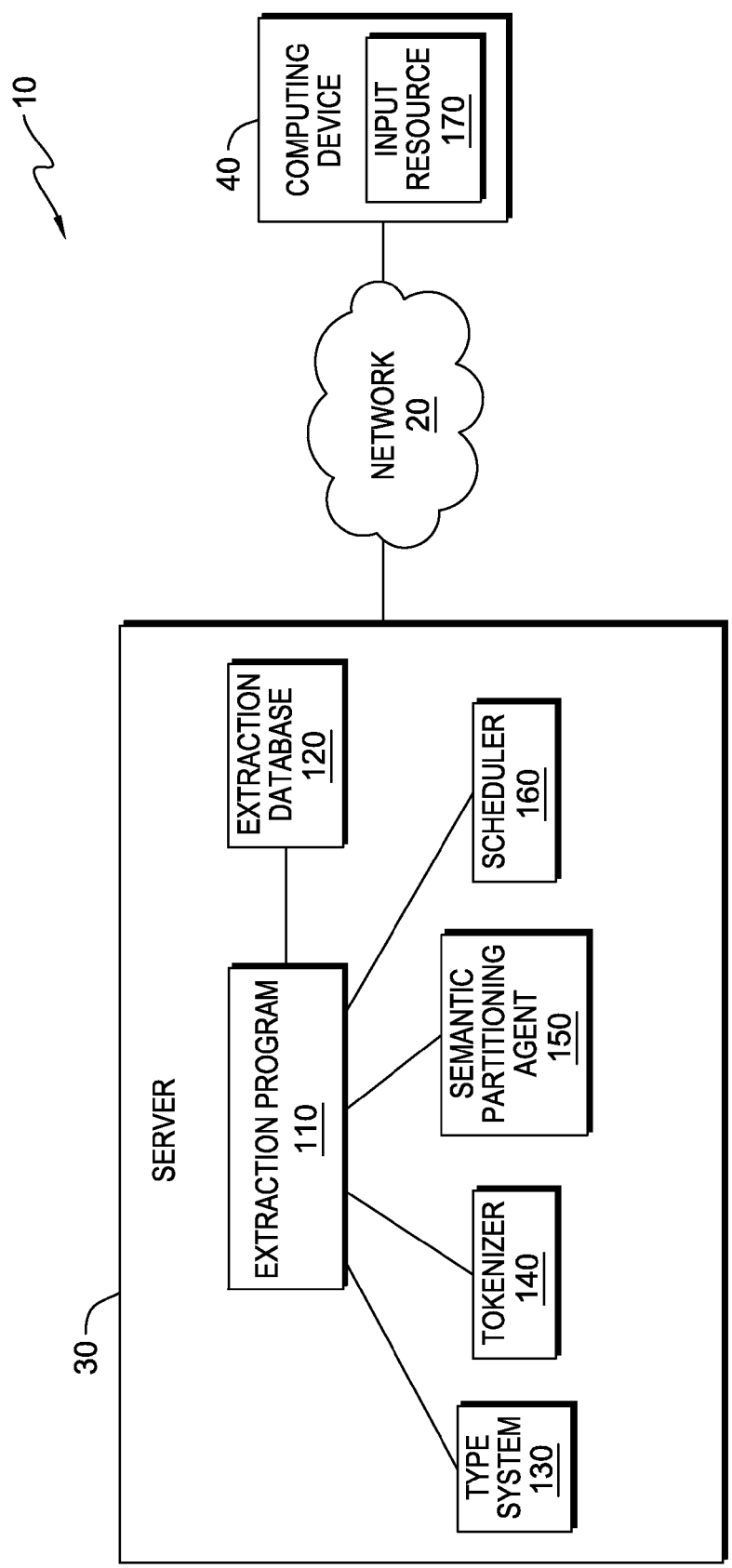
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. Server 30 contains extraction program 110, extraction database 120, type system 130, tokenizer 140, semantic partitioning agent 150, and scheduler 160. Server 30 may include components, as depicted and described in further detail with respect to FIG. 3.

Computing device 40 may be a desktop computer, laptop computer, netbook computer, or tablet computer. In general, computing device 40 may be any electronic device or computing system capable of processing program instructions, sending and receiving data, and communicating with server 30 via network 20. Computing device 40 contains input resource 170. Computing device 40 may include components, as depicted and described in further detail with respect to FIG. 3.

Input resource 170 may be any document that contains text. For example, input resource 170 may be an email, webpage, website, research paper, etc. In some embodiments, input resource 170 may be any web document containing information accessible to other computing devices, such as server 30, over network 20. In general, input resource 170 is any document capable of being accessed by extraction program 110. In the depicted embodiment, input resource resides on computing device 40. In other embodiments, input resource 170 may reside on another computing device, another server, or server 30, provided that input resource 170 is accessible to extraction program 110.

Extraction program 110 operates to parallelize document processing in an information handling system using natural language processing. In doing so, extraction program 110 retrieves documents, such as medical forms, articles, emails, etc. The information in the documents may be unstructured or semi-structured. Extraction program 110 tokenizes the retrieved documents. Extraction program 110 annotates each token in the token stream. Extraction program 110 semantically partitions the token stream. Extraction program 110 processes each sub-document. In the depicted embodiment, extraction program 110 resides on server 30. In other embodiments, extraction program 110 may reside on another server, computing device, or computing device 40, provided that extraction program 110 can access extraction database 120, type system 130, tokenizer 140, semantic partitioning agent 150, scheduler 160, and input resource 170.

Extraction database 120 may be a repository that may be written and/or read by extraction program 110. In some embodiments, a program (not shown) may allow a web developer, administrator, or other user to define partitioning parameters and store to extraction database 120. Partitioning parameters are parameters used to partition a document (e.g., by words, paragraphs, sections, etc.). In some embodiments, tokens are stored to extraction database 120. Tokens are pieces of data obtained by breaking up a stream of text into words, phrases, symbols, or other meaningful elements. In other embodiments, extraction database 120 is used to save and reference elements of a data dependency workflow with identifications for sub-elements preserved through the natural language processing pipeline. The word pipeline is defined as a set of data processing elements connected in a series, where the output of one element is the input of the next element. A data dependency is a situation in which a program statement (instruction) refers to the data of a preceding statement. In the depicted embodiment, extraction database 120 resides on server 30. In other embodiments, extraction database 120 may reside on another server, computing device, or computing device 40, provided that extraction database 120 is accessible to extraction program 110.

Type system 130, used in conjunction with extraction program 110, is a collection of rules that assign a type to the various constructs—such as variables, expressions, functions, or modules—that of which a computer program is composed. A type, or data type, is a classification identifying one of various types of data, such as real, integer, or Boolean, that determines the possible values for that type, the operations that can be done on values of that type, the meaning of the data, and the way values of that type can be stored. The main purpose of a type system is to reduce bugs in computer programs, such as extraction program 110, by defining interfaces between different parts of a computer program, and checking that the parts have been connected in a consistent way. Checking that the parts have been connected in a consistent way can happen statically (e.g., at compile time), dynamically (e.g., at run time), or as a combination of static and dynamic checking.

In some embodiments, type system 130 may be a repository. In other embodiments, type system 130 may be a database that merely stores information. Still, in other embodiments, type system 130 may be a knowledge base that is governed by an ontology. A knowledge base is a technology used to store complex structured and unstructured information used by a computer system. A knowledge-based system consists of a knowledge base that represents facts and an inference engine that can reason about those facts and use rules and other forms of logic to deduce facts or highlight inconsistencies. In some embodiments, information stored in a knowledge base may include: function categories; descriptions; services; service functions; capabilities and configurations; and WordNet (a lexical database for the English language). An ontology is a formal, explicit specification of a shared abstract simplified view of some selected part of the world, containing the objects, concepts, and other entities that are presumed of interest for some particular purpose and the relationships between them. In some embodiments, an ontology may use the information stored in a knowledge base to form and identify the relationships between different data types.

Type system 130 captures a hierarchy in the extraction process, as in the notion of an ontology. Some types are dependent on other types and are only extracted when the types for which the other types depend are available and extracted previously. For example, an extraction and operation dealing with an integer data type can depend on an extraction and operation dealing with a Boolean data type that happens before the extraction and operation dealing with the integer data type. The data dependency in the real world is sparse and affords tons of parallelism in the early stages of extraction, allowing many sub-documents to have extractors run on the sub-documents with full parallelization.

Additionally, type system 130 associates a type with each computed value. By examining the flow of these values, type system 130 attempts to ensure or prove that no type errors can occur. The particular type system in question determines exactly what constitutes a type error, but in general, type system 130 aims to prevent operations expecting a certain kind of value from being used with values for which that operation does not make sense (logic errors); memory errors may also be prevented. In the depicted embodiment, type system 130 stands alone and resides on server 30. In other embodiments, type system 130 may be a function embedded within extraction program 110. Still, in other embodiments, type system 130 may reside on another server, computing device, or computing device 40, provided that type system 130 is accessible to extraction program 110.

Tokenizer 140 breaks down text of a document into individual objects. These objects, called tokens, may be strings, words, or other objects. In one embodiment, tokenizer 140 is a simple tokenizer that splits up text into terms wherever tokenizer 140 encounters whitespace or punctuation. In other embodiments, tokenizer 140 is a primitive tokenizer. A primitive tokenizer uses primitive data types in the breakdown process. Primitive data type is either of the following: (1) a basic type is a data type provided by a programming language as a basic building block; or (2) a built-in type is a data type for which the programming language provides built-in support. Basic primitive types may, for example, include: character; integer; floating-point number; fixed-point number; Boolean; and reference. In the depicted embodiment, tokenizer 140 stands alone and resides on server 30. In other embodiments, tokenizer 140 may be a function embedded within extraction program 110 and reside on server 30. Still, in other embodiments, tokenizer 140, alone or embedded, may reside on another server, another computing device, or computing device 40, provided that tokenizer 140 is accessible to extraction program 110.

Semantic partitioning agent 150 semantically partitions tokens produced by tokenizer 140, producing sub-documents for use by extraction program 110. Semantics is the study of meaning and focuses on the relation between signifiers—like words, phrases, signs, and symbols—and what the signifiers stand for, the signifiers' denotation. In the present invention, sub-documents are separate elements of a structure, or document. The sum of all ordered sub-documents can recreate the original document. The document could be, for example, but not limited to, an email, research paper, or legal form. In the depicted embodiment, semantic partitioning agent 150 stands alone and resides on server 30. In other embodiments, semantic partitioning agent 150 may be a function embedded within extraction program 110 and reside on server 30. Still, in other embodiments, semantic partitioning agent 150, alone or embedded, may reside on another server, another computing device, or computing device 40, provided that semantic partitioning agent 150 is accessible to extraction program 110.

Scheduler 160 is used to load balance and share system resources effectively or achieve a target quality of service (overall performance of a computer network). Scheduling is the method by which threads, processes, or data flows are given access to system resources—for example, processor time and/or communications bandwidth. The need for a scheduling algorithm arises from the requirement for most modern systems to perform multitasking (executing more than one process at a time) and multiplexing (transmitting multiple data streams simultaneously across a single physical channel). The present invention requires at least two concurrently executing threads, wherein the first thread processes the first sub-document and the second thread processes the second sub-document. Scheduler 160 is concerned mainly with throughput, latency, granting equal CPU time to each process, and the time each process remains in queue. The previously mentioned concerns often conflict, so scheduler 160 can implement a suitable compromise. The suitable compromise gives preference to any one of the concerns, depending on a user's needs and objectives. In the depicted embodiment, scheduler 160 resides on server 30. In other embodiments, scheduler 160 may reside on another server, another computing device, or computing device 40, provided that scheduler 160 is accessible to extraction program 110.

Figure 2:
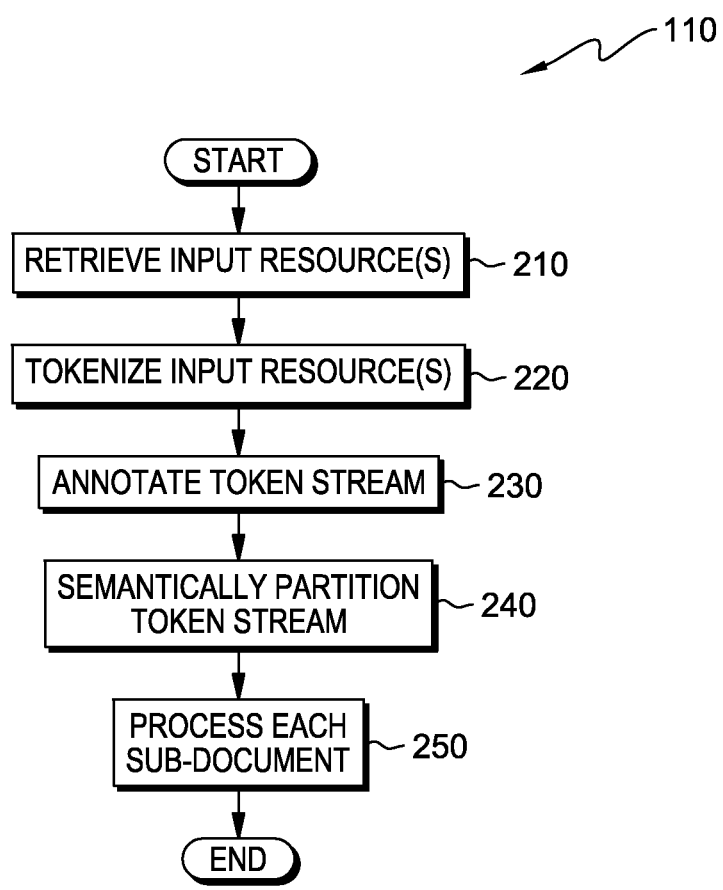
FIG. 2 depicts a flowchart of the steps of an extraction program, executing within the computing system of FIG. 1, for parallelizing document processing in an information handling system using natural language processing, in accordance with an embodiment of the present invention.

FIG. 2 depicts a flowchart of the steps of an extraction program, executing within the computing system of FIG. 1, in accordance with an embodiment of the present invention. Extraction program 110 operates to parallelize document processing in an information handling system using a natural language processing pipeline, in accordance with one embodiment of the present invention. An embodiment of the present invention has an annotation structure that contains: document identification (ID); token ID; sub-document ID (e.g., sentence ID, paragraph ID, section ID); annotator ID (for provenance); annotation type; and annotation value. In general, stages of execution program 110 tags elements within the pipeline to allow for rapid identification of any piece of data. Tagging is helpful for when the original document needs to be reconstructed.

Extraction program 110 may encounter multiple types of documents. A first type of document is a document containing unstructured data (information). Unstructured information refers to information that either does not have a pre-defined data model or is not organized in a pre-defined manner. Unstructured information is typically text-heavy, but may contain data such as dates, numbers, and facts as well. The mixture of data results in irregularities and ambiguities that make unstructured information more difficult to understand using traditional computer programs as compared to data stored in fielded form in databases or annotated in documents. Another type of document is a document containing semi-structured data. Semi-structured data is a form of structured data that does not conform with the formal structure of data models associated with relational databases or other forms of data tables, but, nonetheless, contains tags or other markers to separate semantic elements and enforce hierarchies of records and fields within the data. Semi-structured data is increasingly occurring since the advent of the Internet, where full-text documents and databases are not the only forms of data, and different applications require a medium for exchanging information. Yet another type of document is a compound document. A compound document is a document type typically produced using word processing software, and is a regular text document intermingled with non-text elements, such as spreadsheets, pictures, digital videos, digital audio, and other multimedia features.

Downstream extractors may have data dependency and may need partial or full views of the original document, needing a rapid way to reconstruct the original document while preserving the order of previous extractions. The present invention allows for reconstruction of a sub-document or a full document at points of the parallel processing of said document.

In step 210, extraction program 110 retrieves documents from input resource 170. The documents may include, for example, emails, insurance forms, research articles, etc. In some embodiments, extraction program 110 retrieves one document from input resource 170. In other embodiments, extraction program 110 retrieves multiple documents from input resource 170. Still, in other embodiments, extraction program 110 retrieves one document or multiple documents from input resource 170. In one embodiment, extraction program 110 retrieves documents from input resource 170 in response to a request by a user at server 30 or computing device 40.

In step 220, extraction program 110 tokenizes documents retrieved from input resource 170. In some embodiments, extraction program 110 uses tokenizer 140 to tokenize the documents retrieved from input resource 170. In other embodiments, extraction program 110 may use an internal tokening measure to tokenize the documents retrieved from input resource 170. Extraction program 110 tokenizes the documents into a primitive set of tokens. Typically, tokenization occurs at the word level. However, it is sometimes difficult to define what is meant by "word." Often, a tokenizer relies on simple heuristics, for example: all contiguous strings of alphabetic characters are part of one token (likewise with numbers); tokens are separated by whitespace characters, such as a space or line break, or by punctuation characters; or punctuation and whitespace may or may not be included in the resulting list of tokens. For example, extraction program 110 may use tokenizer 140 to tokenize documents into tokens at the word level. In one embodiment, heuristics are predefined and stored in extraction database 120. In other embodiments, heuristics are contained within an annotator. Still, in some embodiments, heuristics are retrieved from an outside source, such as a source on a different computing device that is accessible by extraction program 120.

In step 230, extraction program 110 annotates the stream of tokens created. Extraction program 110 can determine document domain, document layout, and/or document structural components from the token stream. The output of the annotator provides a document descriptor that assists in furthering extraction program 110. In some embodiments, there exists a conditional algorithm, such as semantic partitioning agent 150, which can decide to split the document into parts based on the document domain, document layout, and/or document structural components.

In step 240, extraction program 110 semantically partitions the stream of tokens. In some embodiments, extraction program 110 uses semantic partitioning agent 150 to semantically partition the stream of tokens. Semantic partitioning agent 150 partitions the stream of tokens from the original document into multiple sub-documents. In some embodiments, the sub-documents are stored in extraction database 120. In other embodiments, the sub-documents are stored in memory. When there is fully free running textual unstructured data, language constructs are followed, and hence, there exists some language-based methodologies that encompass language structure as a means of partitioning the document into a multiplicity of sub-documents without the loss of semantics or information contained within. The language-based methodologies are language dependent. In one embodiment, the annotators possess metadata about the scope at which the annotators expect data (sentence, paragraph, section, etc.). Extraction program 110 uses the information to determine the sub-document unit granularity. For example, if all current annotators expect sentences or coarser granularity, there is no need to split the document past the sentence granularity. In another embodiment, the knowledge required for semantic partitioning agent 150 to semantically partition the stream of tokens is predefined and received from an outside source, such as extraction database 120. Still, in other embodiments, the knowledge required for semantic partitioning agent 150 to semantically partition the stream of tokens is plugged-in to extraction program 110. When there is semi-structured data, there would exist non-language constructs, for example, sections, sub-sections, and other forms of contextual scoping that could be used to achieve a semantically safe partitioning of a document into sub-documents.

In step 250, extraction program 110 processes each tokenized semantic partition (sub-document). Extraction program 110 uses scheduler 160 to drive each sub-document based on a data dependent scheduling knowledge of type system 130 and a type dependency flow graph. As extraction program 110 processes each sub-document, a degree of parallelism results for the non-dependent parts of the flow at each stage. Scheduler 160 contains a memory (data) barrier to satisfy type dependency and scope dependency. A memory barrier is a type of barrier instruction which causes a central processing unit (CPU) or compiler to enforce an ordering constraint on memory operations issued before and after the barrier instruction. Typically, operations issued prior to the barrier are guaranteed to be performed before operations issued after the barrier. Memory barriers are necessary because most modern CPUs employ performance optimizations that can result in out-of-order execution. The reordering of memory operations (loads and stores) normally goes unnoticed within a single thread of execution, but the reordering can cause unpredictable behavior in concurrent programs and device drivers unless carefully controlled. The exact nature of an ordering constraint is hardware dependent and defined by the architecture's memory ordering model. Some architectures provide multiple barriers for enforcing different ordering constraints. In the present invention, scheduler 160 can enforce different ordering constraints and produce the in-memory forms of relevant data as needed from extraction database 120 to whatever scope is needed by the current annotator, by way of manipulating the key for retrieval of the right scope of partial results.

The type dependency flow graph contains annotator metadata. Metadata, or tag, is data about data, and is a non-hierarchical keyword or term assigned to a piece of information, such as an Internet bookmark, digital image, or computer file. Metadata helps to describe an item and allows the item to be found again by browsing or searching. In the present invention, in some embodiments, each annotator has a description of the input types needed and the output types produced. Also, each annotator is enhanced with a scope partition indicator for the scope requirement.

Given the data dependency knowledge, it is possible to compute portions of the workflow to essentially be done in parallel—on a case-by-case basis. In addition to data dependency, scope dependency is also used to allow the most efficient scheduling of annotators. For example, consider the following scenario:

"This is a sentence boundary. But it's possible to have two of them." Annotator A (defined with sentence scope) looks for noun phrases. Finds "sentence boundary" in the first sentence." Outputs A. Annotator B (defined with sentence scope) looks for pronouns. Finds "them" in the second sentence. Outputs B. Annotator C (defined with paragraph scope) looks for type B and tries to determine to what the pronoun refers, and sets that string on a feature. C finds B, then looks at prior sentence in the paragraph and modifies B to include the target of the pronoun, which is in the text of type A.

First, A and B run in parallel over each sentence. Then, C runs over the "paragraph" afterwards due to the type dependency on B. Concurrently with C, A and B continue to process further into the document.

The sub-documents are keyed and numbered (annotated) appropriately to represent the order of occurrence within the document, so that reconstruction to whatever granularity scope can be achieved at any point in the extraction workflow.

Figure 3:
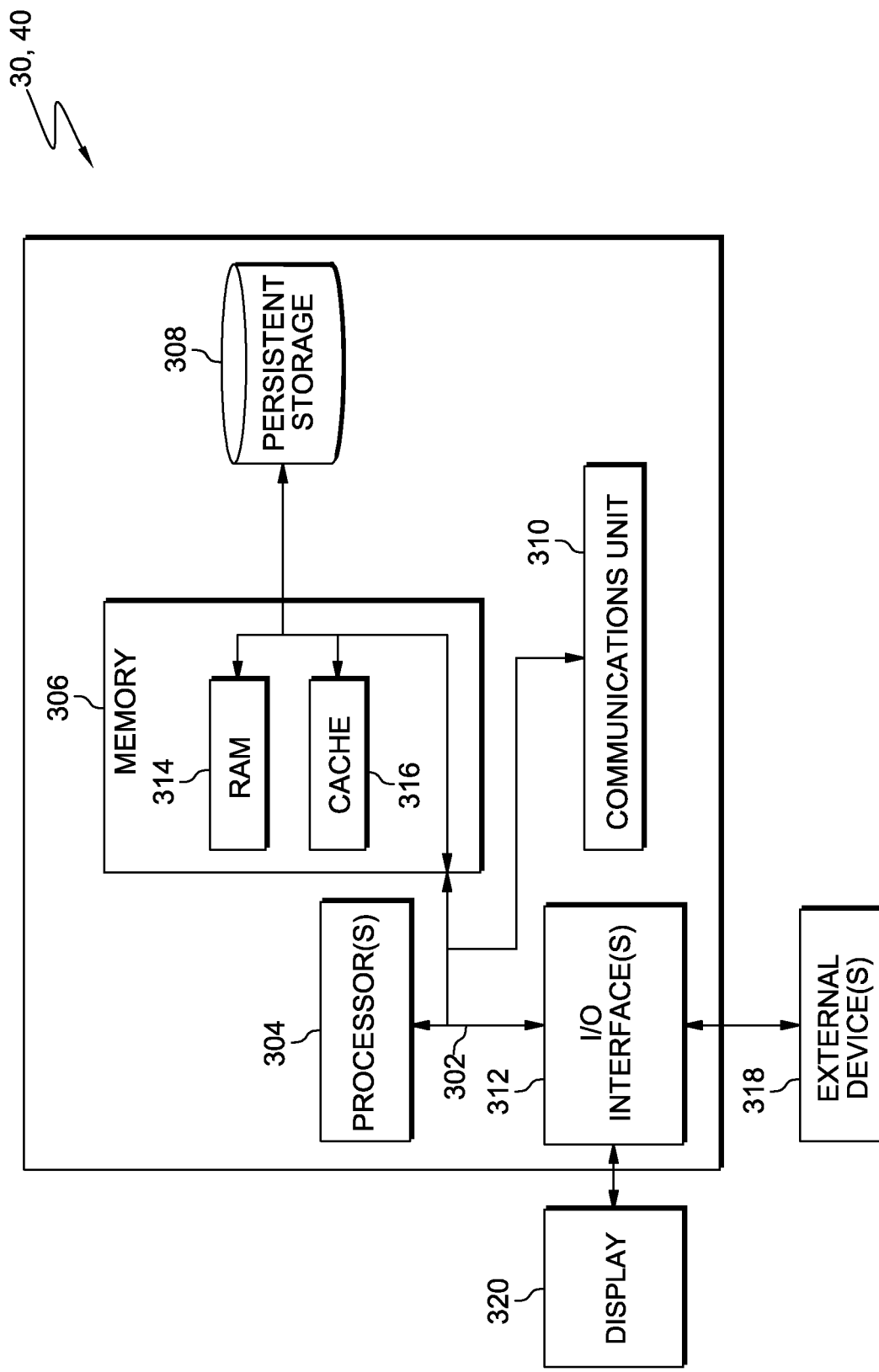
FIG. 3 depicts a block diagram of components of the server and the computing device, in accordance with an embodiment of the present invention.

FIG. 3 depicts a block diagram of components of server 30 and computing device 40, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Sever 30 and computing device 40 each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Extraction program 110, extraction database 120, type system 130, tokenizer 140, semantic partitioning agent 150, and scheduler 160 are stored in persistent storage 308 of server 30 for execution and/or access by one or more of the respective computer processors 304 of server 30 via one or more memories of memory 306 of server 30. Input resource 170 is stored in persistent storage 308 of computing device 40 for execution by one or more of the respective computer processors 304 of computing device 40 via one or more memories of memory 306 of computing device 40. In this embodiment, persistent storage 308 includes a magnetic hard disk drive. Alternatively, or in addition to magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Extraction program 110, extraction database 120, type system 130, tokenizer 140, semantic partitioning agent 150, and scheduler 160 may be downloaded to persistent storage 308 of server 30 through communications unit 310 of server 30. Input resource 170 may be downloaded to persistent storage 308 of computing device 40 through communications unit 310 of computing device 40.

I/O interface(s) 312 allows for input and output of data with other devices that may be connected to server 30 or computing device 40. For example, I/O interface 312 may provide a connection to external device(s) 318, such as keyboard, keypad, a touch screen, and/or some other suitable input device. External device(s) 318 can also include portable computer readable storage media (e.g., thumb drives, portable optical or magnetic disks, and memory cards). Software and data used to practice embodiments of the present invention, e.g., extraction program 110, extraction database 120, type system 130, tokenizer 140, semantic partitioning agent 150, and scheduler 160, can be stored on such portable computer readable storage media and can be loaded onto persistent storage 308 of server 30 via I/O interface(s) 312 of server 30. Software and data used to practice embodiments of the present invention, e.g., input resource 170, can be stored on such portable computer readable storage media and can be loaded onto persistent storage 308 of computing device 40 via I/O interface(s) 312 of computing device 40. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for parallelizing document processing in an information handling system, the method comprising:
   receiving, by one or more processors, a document, wherein the document includes text content, given a particular granularity scope;
   extracting, by one or more processors, information from the text content, utilizing natural language processing and semantic analysis, to form tokenized semantic partitions, comprising a plurality of sub-documents, wherein:
     the tokenized semantic partitions each have a particular data type;
     the plurality of sub-documents are annotated to represent an order of occurrence within the document; and
     the annotated plurality of sub-documents allows reconstruction to the particular granularity scope at any point during the extraction;
   reconstructing, by one or more processors, the document by scheduling a process for the annotated plurality of sub-documents, wherein:
     the scheduling drives each of the annotated sub-documents in parallel by using a memory barrier to enforce an ordering constraint on the annotated plurality of sub-documents based on a data dependent scheduling order using the data types of the sub-documents and a type dependency flow graph for the annotated sub-documents given the particular granularity scope, wherein non-dependent parts of the sub-documents can be processed out-of-order,
     the dependency flow graph comprises information about which data types are dependent on other data types in a dependency order, and
     by using the type dependency flow graph, the sub-documents that have data types that do not depend upon each other can be driven in parallel and processed out of order of occurrence, while the sub-documents that have data types that depend on each other are constrained and processed according to the dependency order using the memory barrier; and
   retrieving, by one or more processors, numbered annotation data within the scheduled and annotated plurality of sub-documents, representing the order of occurrence, wherein the reconstructed document preserves the order of occurrence of previous extractions based on the retrieved numbered annotation data.

2. The method of claim 1, wherein the plurality of sub-documents are separate components of a document.

3. The method of claim 1, wherein the process is a plurality of concurrently executing threads.

4. The method of claim 1, wherein each sub-document is processed using a data dependency workflow, containing annotator metadata, wherein each annotator metadata has a description of input types needed and output types produced.

5. The method of claim 1, further comprising:
- annotating, by one or more processors, each sub-document;
- storing, by one or more processors, each annotated sub-document; and
- reconstructing, by one or more processors, the document using each sub document, based on information in the annotated sub-document.

6. The method of claim 1, wherein the plurality of sub-documents are partitioned based on data type and scope of the text content.

7. The method of claim 6, wherein scope of the text content is selected from a group consisting of word, sentence, and paragraph.

\* \* \* \* \*